(12) United States Patent
Agin et al.

(10) Patent No.: US 7,454,224 B2
(45) Date of Patent: Nov. 18, 2008

(54) METHOD FOR IMPROVING THE PERFORMANCES OF A MOBILE RADIOCOMMUNICATION SYSTEM USING A POWER CONTROL ALGORITHM

(75) Inventors: Pascal Agin, Chatillon (FR); Michael Jeschke, Stuttgart (DE)

(73) Assignee: Evolium S.A.S., Paris (FR)

( * ) Notice: Subject to any disclaimer, the term of this patent is extended or adjusted under 35 U.S.C. 154(b) by 522 days.

(21) Appl. No.: 11/016,864

(22) Filed: Dec. 21, 2004

(65) Prior Publication Data

US 2005/0159178 A1    Jul. 21, 2005

(30) Foreign Application Priority Data

Dec. 22, 2003  (EP) .................................. 03293285

(51) Int. Cl.
*H04B 7/00* (2006.01)
(52) U.S. Cl. ....................... 455/522; 455/69; 455/67.11
(58) Field of Classification Search ................. 455/522, 455/69, 67.1, 571, 127, 422, 13.4; 370/329, 370/330, 332, 318
See application file for complete search history.

(56) References Cited

U.S. PATENT DOCUMENTS

| | | | | |
|---|---|---|---|---|
| 6,216,010 B1 * | 4/2001 | Edwards et al. | ............. | 455/522 |
| 6,295,285 B1 * | 9/2001 | Whitehead | ................... | 370/329 |
| 6,308,050 B1 * | 10/2001 | Eklof | ........................... | 455/76 |
| 6,519,236 B1 * | 2/2003 | Haartsen et al. | ............. | 370/332 |
| 6,519,705 B1 * | 2/2003 | Leung | ........................ | 713/300 |
| 2001/0036813 A1 | 11/2001 | Baker | | |
| 2003/0003875 A1 * | 1/2003 | Oestreich | ..................... | 455/69 |
| 2005/0020296 A1 * | 1/2005 | Baker et al. | ................. | 455/522 |

FOREIGN PATENT DOCUMENTS

| | | |
|---|---|---|
| EP | 0 940 933 A2 | 9/1999 |
| EP | 1 139 580 A2 | 10/2001 |
| EP | 1 213 850 A1 | 6/2002 |

OTHER PUBLICATIONS $3^{RD}$ Generation partnership Project: "3GPP TS 25.214 V5.0.0: Physical Layer Procedures (FDD)", 3GPP TS 25.214 V5.0.0, Mar. 2002, pp. 1-56, XP002214164.

* cited by examiner

*Primary Examiner*—Tan Trinh
(74) *Attorney, Agent, or Firm*—Sughrue Mion, PLLC

(57) ABSTRACT

One object of the invention is a method for improving the performances of a mobile radiocommunication system using a power control algorithm, said power control algorithm including an inner-loop power control algorithm for adjusting a transmit power according to received power control commands, said method including:
  a step of deciding if the transmit power should be increased according to a received power control command (TPC (k)) requiring a power increase, having regard to a cumulative power variation ($\Delta_{sum}(k)$) already obtained for last received power control commands,
  a step of determining a cumulative power variation ($\Delta_{sum}(k)$) to be used by said step of deciding, said step of determining including taking into account, further to power adjustments due to said inner-loop power control algorithm, at least one other factor that may affect said cumulative power variation.

18 Claims, 1 Drawing Sheet

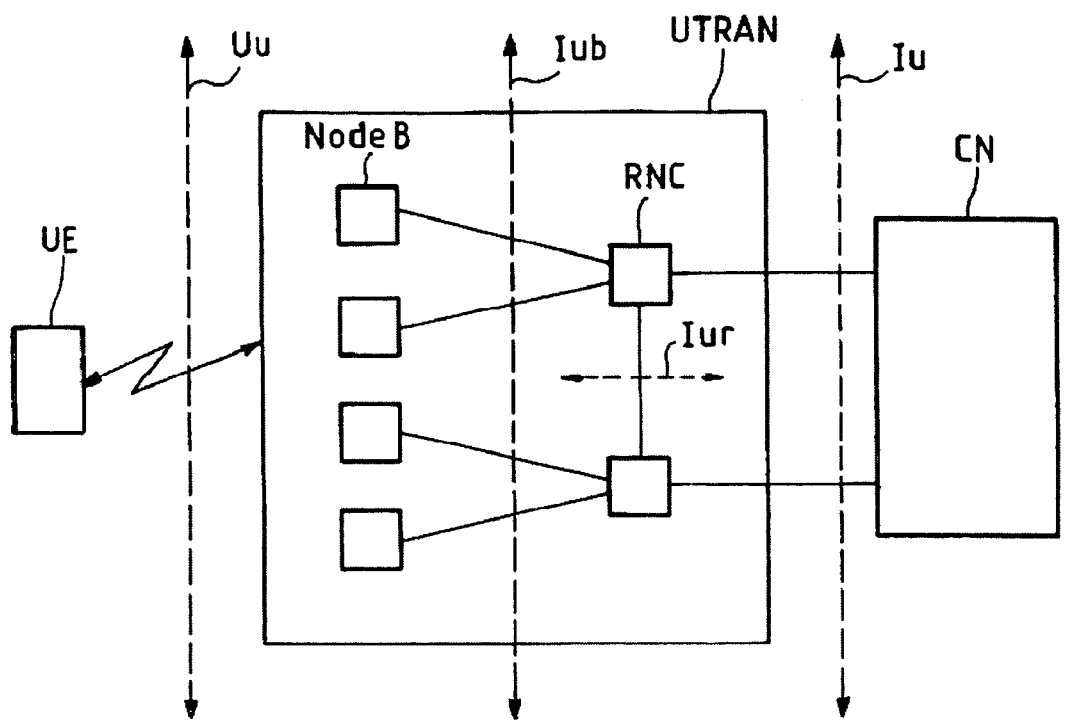
FIG_1
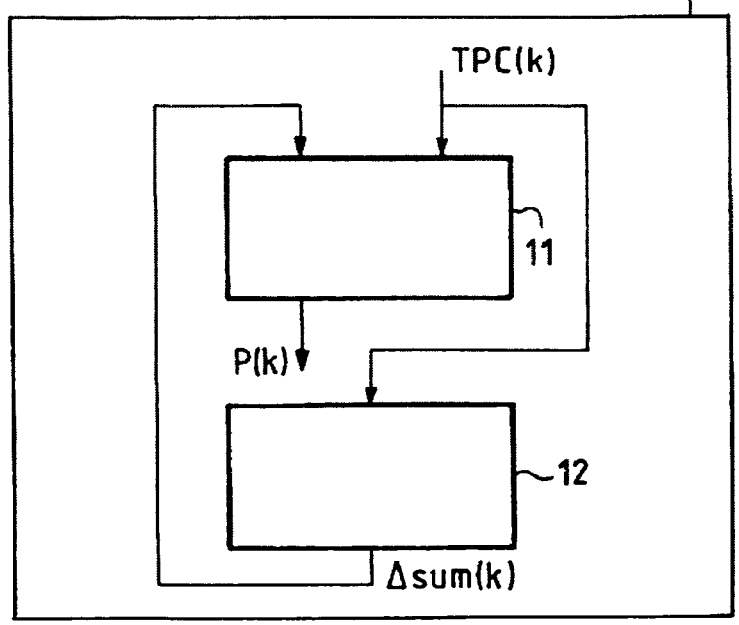
FIG_2

METHOD FOR IMPROVING THE PERFORMANCES OF A MOBILE RADIOCOMMUNICATION SYSTEM USING A POWER CONTROL ALGORITHM

This application is based on and claims the benefit of European Patent Application No. 03293285.7 filed Dec. 22, 2003, which is incorporated by reference herein.

BACKGROUND OF THE INVENTION

The present invention is generally concerned with mobile radiocommunication systems.

The present invention is in particular applicable to third generation mobile radiocommunication systems, such as in particular UMTS (Universal Mobile Telecommunication System).

In a general way, mobile radiocommunication systems are subject to standardisation; therefore, for more information on such systems, it is possible to refer to the corresponding standards, published by the corresponding standardisation bodies, such as for example 3GPP (<<$3^{rd}$ Generation Partnership Project>>).

The general architecture of a mobile radiocommunication system such as in particular a system of UMTS type is recalled in FIG. 1. The system comprises a mobile radiocommunication network communicating with mobile terminals or UE (<<User Equipement>>) and with external networks (not specifically illustrated).

The mobile radiocommunication network comprises:
- a Radio Access Network, or UTRAN (<<UMTS Terrestrial Radio Access Network>>),
- a Core Network, or CN.

Third generation systems, in particular of UMTS type, use a radio access technology of W-CDMA type (where W-CDMA stands for <<Wideband—Code Division Multiple Access>>).

The UTRAN comprises base stations called <<Node B>>, and base station controllers called RNC (<<Radio Network Controller>>). The UTRAN is in relation, on the one hand with mobile terminals UE, via an interface called <<Uu interface>> (or radio interface), and on the other hand with the CN via an interface called <<Iu interface>>. Within the UTRAN, the Nodes B communicate with the RNCs via an interface called <<Iub interface>> and an interface called <<Iur interface>> may also be provided between RNCs.

Power control techniques are generally used in such systems, in particular in systems using a radio access technology of CDMA or W-CDMA type, to improve performances (in terms of quality of service, of capacity, . . . etc.). Such power control techniques in particular include closed-loop power control algorithms, which in turn include inner-loop algorithms and outer-loop algorithms.

The principle of the closed-loop power control algorithm is now recalled, for the downlink for example. In the inner-loop algorithm, the UE periodically estimates the SIR of the signal received from the Node B, and compares this estimated SIR to a target SIR ($SIR_{target}$). If the estimated SIR is lower than the target SIR, the UE sends a command to the Node B for the Node B to increase its transmit power. Otherwise, the UE sends a command to the Node B for the Node B to decrease its transmit power. The target SIR is chosen by the UE as a function of the required quality of service, according to the outer-loop algorithm.

For example, for systems such as UMTS, such a closed-loop power control algorithm is specified in Technical Specification 3GPP TS 25.214.

Further, in the 3GPP standard (release R99 and later releases), an algorithm, known as 'limited power raise algorithm' has been specified, see in particular section 5.2.1.2.2 of TS 25.214 V5.6.0 (2003-09).

The aim of this algorithm is to avoid increasing too rapidly the Node B transmit power. Indeed, in case of deep fading hole, it is preferable to not increase the power too much, since in any case, the power increase will not be fast enough to avoid loosing some data, and since this power increase would cost a significant power resources (that could not be used by other UEs).

In summary, the limited power raise algorithm as currently specified in the standard is the following:

A power control command requiring a power increase, or UP power control command, or UP TPC (where TPC stands for Transmit Power Control), is not applied if the transmit power would be increased by more than $Power_{13}$ $Raise_{13}$ Limit dB over the last $DL_{13}$ $Power_{13}$ $Averaging_{13}$ $Window_{13}$ Size TPC commands.

$Power_{13}$ $Raise_{13}$ Limit and $DL_{13}$ $Power_{13}$ $Averaging_{13}$ $Window_{13}$ Size are parameters of the algorithm and are configured in the Node B by the RNC, using the NBAP (Node B Application Part) protocol at the cell setup (message 'cell setup request' sent by the RNC to the Node B).

The limited power raise algorithm is implemented in the Node B.

The downlink power control algorithm as currently specified in the 3GPP standard is more particularly as follows.

Upon receiving a TPC command, UTRAN shall adjust its downlink DPCCH/DPDCH (Dedicated Physical Control Channel/Dedicated Physical Data Channel) power accordingly. UTRAN shall estimate the transmitted TPC command $TPC_{est}$ to be 0 or 1, and shall update the power.

After estimating the k:th TPC command, UTRAN shall adjust the current downlink power P(k−1) [dB] to a new power P(k) [dB] according to the following formula:

$$P(k)=P(k-1)+P_{TPC}(k)+P_{bal}(k),$$

where $P_{TPC}(k)$ is the k:th power adjustment due to the inner loop power control, and $P_{bal}(k)$ [dB] is a correction according to the downlink power control procedure for balancing radio link powers towards a common reference power.

$P_{TPC}(k)$ is calculated according to the following:

If the value of Limited Power Increase Used parameter is 'Not used', then $$P_{TPC}(k) = \begin{cases} +\Delta_{TPC} & \text{if } TPC_{est}(k) = 1 \\ -\Delta_{TPC} & \text{if } TPC_{est}(k) = 0 \end{cases}, [dB]. \quad (1)$$

If the value of Limited Power Increase Used parameter is 'Used', then the k:th inner loop power adjustment shall be calculated as:

$$P_{TPC}(k) = \begin{cases} +\Delta_{TPC} & \text{if } TPC_{est}(k) = 1 \text{ and } \Delta_{sum}(k) + \Delta_{TPC} < \text{Power\_Raise\_Limit} \\ 0 & \text{if } TPC_{est}(k) = 1 \text{ and } \Delta_{sum}(k) + \Delta_{TPC} \geq \text{Power\_Raise\_Limit, [dB]} \\ -\Delta_{TPC} & \text{if } TPC_{est}(k) = 0 \end{cases} \quad (2)$$

$$\text{where } \Delta_{sum}(k) = \sum_{i=k-\text{DL\_Power\_Averaging\_Window\_Size}}^{k-1} P_{TPC}(i)$$

is the temporary sum of the last $DL_{13}$ Power$_{13}$ Averaging$_{13}$ Window$_{13}$ Size inner loop power adjustments (in dB).

For the first ($DL_{13}$ Power$_{13}$ Averaging$_{13}$ Window$_{13}$ Size–1) adjustments after the activation of the limited power increase method, formula (1) shall be used instead of formula (2). Power_Raise_Limit and DL_Power_Averaging$_{13}$ Window_Size are parameters configured in the UTRAN.

The power control step size $\Delta_{TPC}$ can take four values: 0.5, 1, 1.5 or 2 dB. It is mandatory for UTRAN to support $\Delta_{TPC}$ of 1 dB, while support of other step sizes is optional.

The average power of transmitted DPDCH (Dedicated Physical Data Channel) symbols over one timeslot shall not exceed Maximum_DL_Power (dB), nor shall it be below Minimum_DL$_{13}$ Power (dB). Transmitted DPDCH symbol means here a complex QPSK symbol before spreading which does not contain DTX (Discontinuous Transmission). Maximum$_{13}$ DL_Power (dB) and Minimum_DL_Power (dB) are power limits for one channelisation code, relative to the primary CPICH (Common Pilot Channel) power, as further specified in the 3GPP standard.

Further, in compressed mode, the same algorithm as in normal mode applies but replacing the definition of P(k) by:

$$P(k) = P(k-1) + P_{TPC}(k) + P_{bal}(k) + P_{sir}(k) \quad (3)$$

where $P_{sir}(k)$ is the k:th power adjustment due to the downlink target SIR (Signal-to-Interference Ratio) variation in compressed mode with $P_{sir}(k) = \delta P_{curr} - \delta P_{prev}$, where $\delta P_{curr}$ and $\delta P_{prev}$ are respectively the value of $\delta P$ in the current slot and in the most recently transmitted slot, and the expression of $\delta P$ is given in TS 25.214.

SUMMARY OF THE INVENTION

The present invention in particular recognizes the following problems with such an algorithm as the one currently specified in 3GPP TS 25.214.

These problems are related to the way this algorithm behaves when the Node B is close to its minimum or maximum transmit power (which will happen for all UEs close to the Node B or close to the cell edge).

Such problems may be explained with an example with following setting:

DL_Power_Averaging_Window_Size=10 slots.
Minimum power=0 dBm
Power control step=1 dB.

In this example, for simplicity, power adjustments other than the ones due to the inner-loop power control have not been taken into account, e.g. the power balancing adjustments.

For instance, we consider the following sequence of received TPC (or received power control commands) and DL power (or downlink power) after adjustment according to the received power control commands.

For instance, a received TPC is noted DOWN (–1) for a power control command requiring a power decrease, and UP (+1) for a power control command requiring a power increase.

For instance, we consider a sequence starting with a DL power equal to 2 dBm.

- DL power = 2 dBm
- Receive TPC = DOWN (–1)
=> DL power = 1 dBm        (delta = –1 dB)
- Receive TPC = DOWN (–1)
=> DL power = 0 dBm        (delta = –1 dB)
- Receive TPC = DOWN (–1)
=> DL power = 0 dBm        (delta = 0 dB)
- Receive TPC = DOWN (–1)
=> DL power = 0 dBm        (delta = 0 dB)
- Receive TPC = DOWN (–1)
=> DL power = 0 dBm        (delta = 0 dB)
- Receive TPC = DOWN (–1)
=> DL power = 0 dBm        (delta = 0 dB)
- Receive TPC = UP (+1)
=> DL power = 1 dBm        (delta = +1 dB)
- Receive TPC = UP (+1)
=> DL power = 2 dBm        (delta = +1 dB)
- Receive TPC = UP (+1)
=> DL power = 3 dBm        (delta = +1 dB)
- Receive TPC = UP (+1)
=> DL power = 4 dBm        (delta = +1 dB)
- Receive TPC = UP (+1)
=> DL power = 5 dBm        (delta = +1 dB)
- Receive TPC = UP (+1)
=> DL power = 6 dBm        (delta = +1 dB)
- Receive TPC = UP (+1)

At this moment, i.e. at the moment where this last TPC command is received, the sum of the last DL_Power_Averaging_Window_Size=10 power adjustments due to the inner-loop power control is equal to –1–1–1–1+1+1+1+1+1+1=+2 dB, according to the algorithm as currently defined in TS 25.214 and previously recalled.

This sum is what will be taken into account in the limited power raise algorithm to decide whether it is a too fast increase, in which case the last TPC_UP command will not be taken into account.

The problem is that this sum is quite small (2 dB), which gives the feeling that the power increase over the last 10 TPC commands is quite small, in which case we will probably accept the last TPC_UP command.

However, the real power increase during the last slots is equal to 0+0+0+0+1+1+1+1+1+1=+6 dB, i.e. is much larger, it is not equal to the sum of power adjustments corresponding to TPC commands, since some TPC commands were not taken into account because of the minimum power that was already reached. And maybe in this case, it would be preferable to not accept this last TPC command.

For example, if the parameter Power_Raise_Limit is set to 4 dB and considering the previous example: with the current implementation in the standard, the last TPC_UP command will be accepted (and the Node B power will be increased by 1 dB). However, it would be better to reject it since the real power increase was equal to 6 dB.

The same problem occurs when the Node B power is close to the maximum power (in this case, there may be some TPC_UP commands not taken into account by the Node B because it already reaches the maximum power, which will cause similar problem as the one described previously). For example, it may happen that, starting from the maximum power, and after a short power decrease, a new power increase is required but not accepted, as the current algorithm makes as if the Node B had previously increased its power too much, whereas it is in fact not the case as the Node B had reached the maximum transmit power. The problem is even more critical in the case where the Node B is close to its maximum power, since the Node B consumes a larger power.

In other words, an algorithm such as the one currently specified in the 3GPP standard does not behave correctly when the Node B power is close to the minimum or maximum transmit power, i.e. in some case we will accept or reject a TPC_UP command whereas we should have rather done the contrary.

Still in other words, the present invention recognizes that there is a need to optimise a limited power raise algorithm such as the one currently specified in the 3GPP standard, at least for the reason that power limitations are not taken into account in this algorithm, which may result in a degradation of the performances of the system (in terms of quality of service, of capacity, . . . ). More generally, the present invention recognizes that there is a need to optimise such an algorithm, as the decision which is made in this algorithm is based on power adjustments due to the inner-loop power control, whereas other factor(s) could also be taken into account so that this decision could be based on a quantity closer to a real power variation, and the performances of the system could therefore be improved.

The present invention in particular enables to solve part or all of the above-mentioned problems, or to avoid part or all of the above-mentioned drawbacks. More generally the aim of the present invention is to improve the performances of power control algorithms in such systems.

These and other objects are achieved, in one aspect of the present invention, by a method for improving the performances of a mobile radiocommunication system using a power control algorithm, said power control algorithm including an inner-loop power control algorithm for adjusting a transmit power according to received power control commands, said method including:
- a step of deciding if the transmit power should be increased according to a received power control command requiring a power increase, having regard to a cumulative power variation already obtained for last received power control commands,
- a step of determining a cumulative power variation to be used by said step of deciding, said step of determining including taking into account, further to power adjustments due to said inner-loop power control algorithm, at least one other factor that may affect said cumulative power variation.

Though the present invention is of particular interest for the case of downlink power control, it is not limited to this case and could also be used for the case of uplink power control.

The present invention also has for its object an equipment for a mobile radiocommunication system, such as a network equipment, such as in particular base station (or Node B), for performing such a method in particular for downlink power control, or a mobile terminal (or UE) for performing such a method in particular for uplink power control, as well as a mobile radiocommunication system, comprising at least one such equipment.

Other aspects and/or objects of the present invention will be defined in the appended claims.

BRIEF DESCRIPTION OF THE DRAWINGS

These and other aspects and/or objects of the present invention will become more apparent from the following description taken in conjunction with the accompanying drawings, wherein:

FIG. 1 is intended to recall the general architecture of a mobile radiocommunication system, such as in particular UMTS, FIG. 2 is intended to illustrate an example of means which can be provided in an equipment such as a network equipment such as in particular Node B, to carry out a method according to the invention.

MORE DETAILED DESCRIPTION

The present invention may also be explained in the following way.

The invention suggests to take the decision of the limited power raise algorithm, based on a quantity closer to the real power variation, and not based on the sum of the last power adjustments due to the inner-loop algorithm. Indeed, some of these power adjustments may be not taken into account by the Node B, when reaching the minimum and the maximum DL power. More generally, other factor(s) could be taken into account in order that this quantity be as close as possible to a real power variation.

The invention enables to have a better behavior of the limited power raise algorithm and therefore to have better performance with this algorithm (i.e. reach the QoS (Quality of Service) of the UE, while consuming as low power as possible):
- it will avoid to increase the Node B power when it is not necessary, thus avoiding to consume too much Node B power (this case may currently occur when the DL power is close to the minimum power)
- it will avoid to prevent increasing the Node B power when it is necessary, thus enabling to reach the QoS of the UE (this case may currently occur when the DL power is close to the maximum power).

The invention proposes an algorithm or method comprising:
- a step of deciding if the transmit power should be increased according to a received power control command (TPC (k)) requiring a power increase, having regard to a cumulative power variation ($\Delta_{sum}(k)$) already obtained for last received power control commands,
- a step of determining a cumulative power variation ($\Delta_{sum}(k)$) to be used by said step of deciding, said step of determining including taking into account, further to power adjustments due to said inner-loop power control algorithm, at least one other factor that may affect said cumulative power variation.

Examples of optimisation of an algorithm such as the one currently specified in the 3GPP standard and recalled above will be disclosed in the following. However, as understood by the skilled person, the present invention is not limited to power control as specified in the 3GPP standard.

In a first example, the present invention proposes the following expression for the quantity $\Delta_{sum}(k)$ which is used in the 3GPP standard to decide if the transmit power should be increased according to a power control command requiring a power increase:

$$\Delta_{sum}(k) = \sum_{i=k-\text{DL\_Power\_Averaging\_Window\_Size}}^{k-1} Q_{TPC}(i)$$

with:
In normal mode:

$Q_{TPC}(k)=P(k)-P(k-1)$

In compressed mode:

$Q_{TPC}(k)=(P(k)-P_{SIR}(k))-P(k-1)$ and with the following expression for the adjusted transmit power P(k):
In normal mode:

$P(k)=\text{min\_max\_limit}(P(k-1)+P_{TPC}(k)+P_{bal}(k))$ where the function "min_max_limit(.)" represents the limiting function to keep P(k) within the power limit imposed by Maximum_DL_Power and Minimum_DL_Power.
More precisely, the min_max_limit function corresponds to:
min_max_limit(x)=Maximum_DL_Power   if x>Maximum_DL_Power
min_max_limit(x)=Minimum_DL_Power   if x<Minimum_DL_Power
min_max_limit(x)=x otherwise
In compressed mode:

$P(k)=\text{min\_max\_limit\_cm}(P(k-1)+P_{TPC}(k)+P_{bal}(k)+P_{sir}(k))$ where the function "min_max_limit_cm(.)" represents the limiting function to keep P(k) within the power limit imposed by Maximum_DL_Power+$\delta P_{curr}$ and Minimum_DL_Power.
More precisely, the min_max_limit_cm function corresponds to:
min_max_limit_cm(x)=Maximum_DL_Power+$\delta P_{curr}$   if x>Maximum_DL_Power+$\delta P_{curr}$
min_max_limit_cm(x)=Minimum_DL_Power   if x<Minimum_DL_Power
min_max_limit_cm(x)=x otherwise.
In a second example, the present invention proposes the following expression for the quantity $\Delta_{sum}(k)$ which is used in the 3GPP standard to decide if the transmit power should be increased according to a power control command requiring a power increase:

$$\Delta_{sum}(k) = \sum_{i=k-\text{DL\_Power\_Averaging\_Window\_Size}}^{k-1} Q_{TPC}(i)$$

with:
If P(k)=Maximum_DL_Power+$\delta P_{curr}$ [with $\delta P_{curr}$=0 if the k:th slot is a normal slot or $\delta P_{curr}$>0 if the k:th slot is a compressed slot, according to TS 25.214]:

$Q_{TPC}(k)=0$

If P(k)=Minimum_DL_Power:

$Q_{TPC}(k)=0$

Otherwise: $Q_{TPC}(k)=P_{TPC}(k)$
and with the same expression of the adjusted power P(k) as indicated above for the first example.

In a third example, the present invention proposes the following expression for the quantity $\Delta_{sum}(k)$ which is used in the 3GPP standard to decide if the transmit power should be increased according to a power control command requiring a power increase:

$$\Delta_{sum}(k) = \sum_{i=k-\text{DL\_Power\_Averaging\_Window\_Size}}^{k-1} Q_{TPC}(i)$$

with:
If P(k)>Maximum_DL_Power+$\delta P_{curr}$ [with $\delta P_{curr}$=0 if the k:th slot is a normal slot or $\delta P_{curr}$>0 if the k:th slot is a compressed slot, according to TS 25.214]:

$Q_{TPC}(k)=0$

If P(k)<Minimum_DL_Power:

$Q_{TPC}(k)=0$

Otherwise: $Q_{TPC}(k)=P_{TPC}(k)$
with an expression of the adjusted power P(k) which can be the some as the one currently stated in the standard, i.e. an expression which does not need to be modified to take into account the above-mentioned limiting function ("min_max_limit(.)" in normal mode or "min_max_limit_cm(.)" in compressed mode).

In the first example, the power limits Maximum_DL_Power and Minimum_DL_Power are taken into account by means of the limiting function ("min_max_limit(.)" in normal mode or "min_max_limit_cm(.)" in compressed mode).

In the second example, the power limits Maximum_DL_Power and Minimum_DL_Power are taken into account by means of the limiting function ("min_max_limit(.)" in normal mode or "min_max_limit_cm(.)" in compressed mode), and by means of checking if the equalities P(k)=Maximum_DL_Power+$\delta P_{curr}$ or P(k)=Minimum_DL_Power are fulfilled.

In the third example, the power limits Maximum_DL_Power and Minimum_DL_Power are taken into account by means of checking if the inequalities P(k)>Maximum_DL_Power+$\delta P_{curr}$ or P(k)<Minimum_DL_Power are fulfilled.

Compared to the second and third example, the first example enables to determine a quantity $\Delta_{sum}(k)$ which is closer to the real power variation. In particular, the term $P_{bal}(k)$ is included in the term P(k) on which the determination of the power variation is based. Further, the term $P_{sir}(k)$ is substracted from P(k) before calculating the power variation, as this term corresponds to a power offset in compressed mode, which is not representative of the power variation which is needed for the limited power raise algorithm.

Compared to the first example, the second and third example enable a simplification of the algorithm, while still providing good performance.

Compared to the second example, the third example requires less modification of the current state of the standard.

Of course, as understood by the skilled person, other examples could be possible.

Besides, though the invention has been more particularly illustrated for the case of downlink power control, it could also be applied to uplink power control.

The present invention also has for its object an equipment for a mobile radiocommunication system, such as a network equipment, such as in particular base station (or Node B) for carrying out such a method in particular for downlink power control, or a mobile terminal (or UE) for carrying out such a method in particular for uplink power control.

According to the embodiment illustrated in FIG. 2, an equipment for a mobile radiocommunication system, such as illustrated at 10, comprises, further to other classical means (not mentioned here and which may be classical):

means 11 for deciding if a received power control command (TPC(k)) requiring a power increase should be applied, having regard to a cumulative power variation ($\Delta_{sum}$(k)) already obtained for last applied power control commands, means 12 for determining a cumulative power variation ($\Delta_{sum}$(k)) to be used by said means for deciding, said means 12 for determining a cumulative power variation including means for taking into account, further to power adjustments due to said inner-loop power control algorithm, at least one other factor that may affect said cumulative power variation.

Said means 12 may for example include means for performing a method according to any one of the above-mentioned first, second or third examples.

Because the specific implementation of the above means will represent no particular difficulty for the person skilled in the art, they do not need to be described in more detail here than as above, by stating their function.

The present invention also has for its object a mobile radiocommunication system, comprising at least one such equipment according to the present invention.

The invention claimed is:

1. A method for improving the performances of a mobile radiocommunication system using a power control algorithm, said power control algorithm including an inner-loop power control algorithm for adjusting a transmit power according to received power control commands, said method including:

a step of deciding if the transmit power should be increased according to a received power control command (TPC (k)) requiring a power increase, having regard to a cumulative power variation ($\Delta_{sum}$(k)) already obtained for last received power control commands, a step of determining the cumulative power variation ($\Delta_{sum}$(k)) to be used by said step of deciding, said step of determining including taking into account, further to power adjustments ($P_{TPC}$(k)) due to said inner-loop power control algorithm, at least one other factor that may affect said cumulative power variation.

2. A method according to claim 1, wherein said at least one other factor corresponds to at least one power limitation, said step of determining including taking into account that a power adjustment does not result in any power variation beyond the reaching of a power limit (Maximum_DL_Power, Minimum_DL_Power).

3. A method according to claim 1, wherein said cumulative power variation is determined based on an adjusted power (P(k)) including different types of power adjustments and said at least one other factor corresponds to at least one other type of power adjustment, other than a power adjustment ($P_{TPC}$(k)) due to said inner-loop power control algorithm.

4. A method according to claim 3, wherein said at least one other type of power adjustment corresponds to a correction ($P_{bal}$(k)) according to a downlink power control procedure for balancing radio link powers towards a common reference power.

5. A method according to claim 3, wherein one other type of power adjustment corresponds to a power adjustment ($P_{sir}$(k)) due to a target SIR variation in compressed mode, and is subtracted from said adjusted power (P(k)), for determining said cumulative power variation.

6. A method according to claim 1, wherein said cumulative power variation is determined based on power adjustments ($P_{TPC}$(k)) due to said inner-loop power control algorithm.

7. A method according to claim 1, wherein said step of determining a cumulative power variation includes determining a value $\Delta_{sum}$(k) which is such that:

$$\Delta_{sum}(k) = \sum_{i=k-DL\_Power\_Averaging\_Window\_Size}^{k-1} Q_{TPC}(i)$$

with:
In normal mode:

$Q_{TPC}(k)=P(k)-P(k-1)$

In compressed mode:

$Q_{TPC}(k)=(P(k)-P_{SIR}(k))-P(k-1)$ where:
DL_Power_Averaging_Window_Size corresponds to the number of said last received power control commands Maximum_DL_Power and Minimum_DL_Power correspond respectively to a maximum and a minimum power limit P(k), respectively P(k−1) corresponds to the adjusted power after a k:th, respectively a (k−1):th power adjustment, with:

In normal mode:

$P(k)=\min\_max\_limit(P(k-1)+P_{TPC}(k)+P_{bal}(k))$ where the function "min_max_limit(.)" represents the limiting function to keep P(k) within a maximum and a minimum power limit In compressed mode:

$P(k)=\min\_max\_limit\_cm(P(k-1)+P_{TPC}(k)+P_{bal}(k)+P_{sir}(k))$ where the function "min _max_limit_cm(.)" represents the limiting function to keep P(k) within a maximum and a minimum power limit and where:

$P_{TPC}$(k) corresponds to a k:th power adjustment due to said inner-loop power control algorithm $P_{bal}$(k) corresponds to a correction according to a downlink power control procedure for balancing radio link powers towards a common reference power $P_{sir}$(k) corresponds to a power adjustment ($P_{sir}$(k)) due to a target SIR variation in compressed mode.

8. A method according to claim 1, wherein said step of determining a cumulative power variation includes determining a value $\Delta_{sum}$(k) which is such that:

$$\Delta_{sum}(k) = \sum_{i=k-DL\_Power\_Averaging\_Window\_Size}^{k-1} Q_{TPC}(i)$$

with:
If P(k)=Maximum_DL_Power+$\delta P_{curr}$ [with $\delta P_{curr}$=0 if the k:th slot is a normal slot or $\delta P_{curr}$>0 if the k:th slot is a compressed slot]:

$Q_{TPC}(k)=0$

If P(k)=Minimum_DL_Power:

$Q_{TPC}(k)=0$

Otherwise: $Q_{TPC}(k)=P_{TPC}(k)$ where:
- DL_Power_Averaging_Window_Size corresponds to the number of said last received power control commands
- Maximum_DL_Power and Minimum_DL_Power correspond respectively to a maximum and a minimum power limit,
- $P_{TPC}(k)$ corresponds to a k:th power adjustment due to said inner-loop power control algorithm
- P(k), respectively P(k−1) corresponds to the adjusted power after a k:th, respectively a (k−1):th power adjustment, with:

In normal mode:

$P(k)=\text{min\_max\_limit}(P(k-1)+P_{TPC}(k)+P_{bal}(k))$ where the function "min_max_limit(.)" represents the limiting function to keep P(k) within a maximum and a minimum power limit In compressed mode:

$P(k)=\text{min\_max\_limit\_cm}(P(k-1)+P_{TPC}(k)+P_{bal}(k)+P_{sir}(k))$ where the function "min_max_limit_cm(.)" represents the limiting function to keep P(k) within a maximum and a minimum power limit
and where:
- $P_{bal}(k)$ corresponds to a correction according to a downlink power control procedure for balancing radio link powers towards a common reference power
- $P_{sir}(k)$ corresponds to a power adjustment ($P_{sir}(k)$) due to a target SIR variation in compressed mode.

9. A method according to claim 1, wherein said step of determining a cumulative power variation includes determining a value $\Delta_{sum}(k)$ which is such that:

$$\Delta_{sum}(k) = \sum_{i=k-\text{DL\_Power\_Averaging\_Window\_Size}}^{k-1} Q_{TPC}(i)$$

with:

If P(k)>Maximum_DL_Power+$\delta P_{curr}$ [with $\delta P_{curr}=0$ if the k:th slot is a normal slot or $\delta P_{curr}>0$ if the k:th slot is a compressed slot]

$Q_{TPC}(k)=0$

If P(k)<Minimum_DL_Power $Q_{TPC}(k)=0$

Otherwise $Q_{TPC}(k)=P_{TPC}(k)$ where:
- DL_Power_Averaging_Window_Size corresponds to the number of said last received power control commands
- Maximum_DL_Power and Minimum_DL_Power correspond respectively to a maximum and a minimum power limit,
- $P_{TPC}(k)$ corresponds to a k:th power adjustment due to said inner-loop power control algorithm
- P(k) corresponds to the adjusted power after a k:th power adjustment.

10. A method according to claim 1, wherein the having regard to a cumulative power variation comprises:
measuring the total power variation ($\Delta_{sum}(k)$) already obtained for last received power control commands; and using the measured total power variation ($\Delta_{sum}(k)$) to decide whether to accept or ignore the received power control command (TPC(k)).

11. An equipment for a mobile radiocommunication system, comprising:
- means for deciding if a received power control command (TPC(k)) requiring a power increase should be applied, having regard to a cumulative power variation ($\Delta_{sum}(k)$) already obtained for last applied power control commands,
- means for determining a cumulative power variation ($\Delta_{sum}(k)$) to be used by said means for deciding, said means for determining a cumulative power variation including means for taking into account, further to power adjustments due to said inner-loop power control algorithm, at least one other factor that may affect said cumulative power variation.

12. An equipment according to claim 11, wherein said means for determining a cumulative power variation comprise means for determining a value $\Delta_{sum}(k)$ which is such that:

$$\Delta_{sum}(k) = \sum_{i=k-\text{DL\_Power\_Averaging\_Window\_Size}}^{k-1} Q_{TPC}(i)$$

with:
In normal mode:

$Q_{TPC}(k)=P(k)-P(k-1)$

In compressed mode:

$Q_{TPC}(k)=(P(k)-P_{sir}(k))-P(k-1)$ where:
- DL_Power_Averaging_Window_Size corresponds to the number of said last received power control commands
- Maximum_DL_Power and Minimum_DL_Power correspond respectively to a maximum and a minimum power limit
- P(k), respectively P(k−1) corresponds to the adjusted power after a k:th, respectively a (k−1):th power adjustment, with:

In normal mode:

$P(k)=\text{min\_max\_limit}(P(k-1)+P_{TPC}(k)+P_{bal}(k))$ where the function "min_max_limit(.)" represents the limiting function to keep P(k) within a maximum and a minimum power limit In compressed mode:

$P(k)=\text{min\_max\_limit\_cm}(P(k-1)+P_{TPC}(k)+P_{bal}(k)+P_{sir}(k))$ where the function "min_max_limit_cm(.)" represents the limiting function to keep P(k) within a maximum and a minimum power limit and where:
- $P_{TPC}(k)$ corresponds to a k:th power adjustment due to said inner-loop power control algorithm
- $P_{bal}(k)$ corresponds to a correction according to a downlink power control procedure for balancing radio link powers towards a common reference power
- $P_{sir}(k)$ corresponds to a power adjustment ($P_{sir}(k)$) due to a target SIR variation in compressed mode.

13. An equipment according to claim 11, wherein said means for determining a cumulative power variation comprise means for determining a value $\Delta_{sum}(k)$ which is such that:

$$\Delta_{sum}(k) = \sum_{i=k-DL\_Power\_Averaging\_Window\_Size}^{k-1} Q_{TPC}(i)$$

with:
If P(k)=Maximum_DL_Power+$\delta P_{curr}$ [with $\delta P_{curr}$=0 if the k:th slot is a normal slot or $\delta P_{curr}$>0 if the k:th slot is a compressed slot]:

$Q_{TPC}(k)=0$

If P(k)=Minimum_DL_Power:

$Q_{TPC}(k)=0$

Otherwise: $Q_{TPC}(k)=P_{TPC}(k)$
where:
DL_Power_Averaging_Window_Size corresponds to the number of said last received power control commands
Maximum_DL_Power and Minimum_DL_Power correspond respectively to a maximum and a minimum power limit
$P_{TPC}(k)$ corresponds to a k:th power adjustment due to due to said inner-loop power control algorithm
P(k), respectively P(k−1) corresponds to the adjusted power after a k:th, respectively a (k−1):th power adjustment, with:
In normal mode:

$P(k)=\text{min\_max\_limit}(P(k-1)+P_{TPC}(k)+P_{bal}(k))$ where the function "min_max_limit(.)" represents the limiting function to keep P(k) within a maximum and a minimum power limit
In compressed mode:

$P(k)=\text{min\_max\_limit\_cm}(P(k-1)+P_{TPC}(k)+P_{bal}(k)+P_{sir}(k))$ where the function "min_max_limit_cm(.)" represents the limiting function to keep P(k) within a maximum and a minimum power limit and where:

$P_{bal}(k)$ corresponds to a correction according to a downlink power control procedure for balancing radio link powers towards a common reference power
$P_{sir}(k)$ corresponds to a power adjustment ($P_{sir}(k)$) due to a target SIR variation in compressed mode.

14. An equipment according to claim 11, wherein said means for determining a cumulative power variation comprise means for determining a value $\Delta_{sum}(k)$ which is such that:

$$\Delta_{sum}(k) = \sum_{i=k-DL\_Power\_Averaging\_Window\_Size}^{k-1} Q_{TPC}(i)$$

with:
If P(k)>Maximum_DL_Power+$\delta P_{curr}$ [with $\delta P_{curr}$=0 if the k:th slot is a normal slot or $\delta P_{curr}$>0 if the k:th slot is a compressed slot]

$Q_{TPC}(k)=0$

If P(k)<Minimum_DL_Power $Q_{TPC}(k)=0$

Otherwise $Q_{TPC}(k)=P_{TPC}(k)$
where:
DL_Power_Averaging_Window_Size corresponds to the number of said last received power control commands
Maximum_DL_Power and Minimum_DL_Power correspond respectively to a maximum and a minimum power limit,
$P_{TPC}(k)$ corresponds to a k:th power adjustment due to said inner-loop power control algorithm
P(k) corresponds to the adjusted power after a k:th power adjustment.

15. An equipment according to claim 11, corresponding to a network equipment.

16. An equipment according to claim 15, corresponding to a base station.

17. An equipment according to claim 11, corresponding to a mobile terminal.

18. A mobile radiocommunication system, comprising at least one equipment according to claim 11.

* * * * *